J. E. HEATH.
MACHINE FOR RAKING AND BINDING GRAIN

No. 7,520. Patented July 22, 1850.

UNITED STATES PATENT OFFICE.

JOHN E. HEATH, OF WARREN, OHIO.

IMPROVEMENT IN MACHINES FOR RAKING AND BINDING GRAIN.

Specification forming part of Letters Patent No. 7,520, dated July 22, 1850.

*To all whom it may concern:*

Be it known that I, JOHN E. HEATH, of Warren, in the county of Trumbull and State of Ohio, have invented a new and useful Machine for Binding Grain to be Attached to Harvesting-Machines, or to be used separately; and I do hereby declare that the following is a full, clear, and exact description of my invention, reference being had to the accompanying drawing, which forms part of this specification, and in which—

Figure 1:
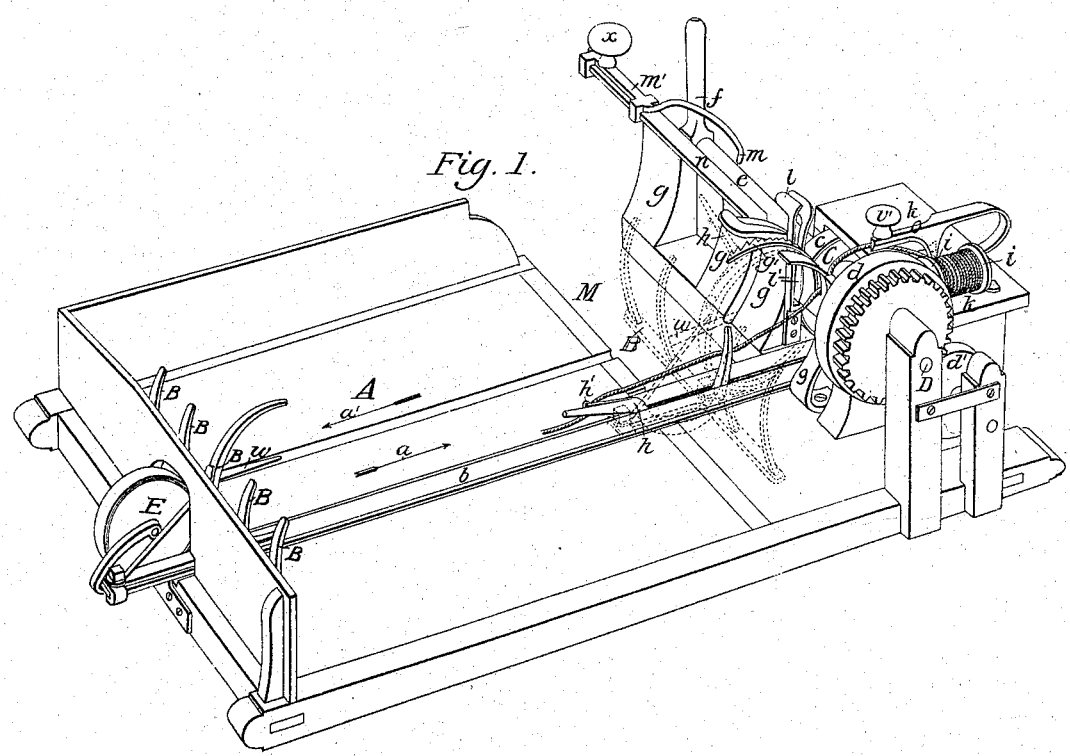
Figure 2:
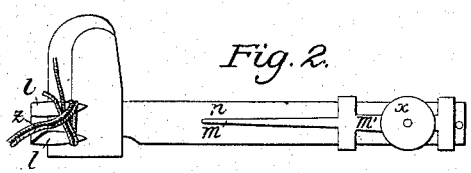
Figure 3:
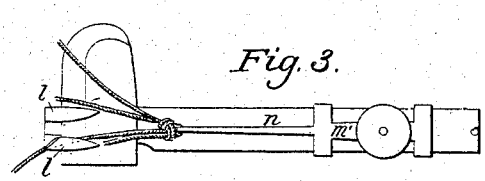

Figure 1 represents a view, in perspective, of my machine; and Figs. 2 and 3 are plans of detached portions of the same to show more clearly its operation.

On my machine the grain is gathered into a sheaf, and is bound by a cord the knot of which can be easily untied when the grain is to be thrashed. The machine represented in the annexed drawing is intended to be attached to a harvester, and is composed, essentially, of two parts—that by which the grain is collected into a sheaf, and that by means of which the binding is effected.

In the accompanying drawing, A is a platform, on which the grain cut by the harvester is delivered, and where it is gathered into a sheaf by means of a rake, B. The rake slides to and fro upon a transverse bar, $b$. It is propelled in the direction of the arrow $a$ by means of a strap, $c$, secured to a drum, C, on a shaft, $s$, which is driven by friction-wheels $d\ d$ from a counter-shaft, D, to which a continuous rotary motion is communicated from the moving machinery of the harvester. That journal of the shaft $e$ farther from the friction-wheels is supported in a box secured to a standard, $f$, pivoted at its lower end to the frame of the platform, and acted upon by a spring whose tendency is to force the two friction-wheels apart. The rake is drawn back, in the direction of the arrow $a'$, by means of a spiral spring in the case E, on the periphery of which a strap is coiled, whose end is secured to the rake-head.

The apparatus by means of which the grain gathered by the rake is compressed into a sheaf is situated at the end of the raking-platform on which the driving machinery is placed. It consists of a set of curved standards, $g\ g$, against which the grain is forced by the rake, and of the devices for tying the cord round the sheaf. In order to effect this last operation a sickle shaped binding-lever, $h$, is pivoted to the platform, immediately adjoining the traverse bar $b$ of the rake. The outer extremity of this binding-lever is furnished with a spring-clamp, $h'$, in which the end of the binding-cord is inserted, the bulk of the cord being wound upon a reel or spool, $i$, supported on the table $k$. The central standard has a toothed arm, $g'$, projecting from it, in the indentations of which the extremity of the binding-lever is engaged to hold the grain during the tying of the knot. This latter operation is effected by means of a spring-thimble, $l$, and a sliding hook, $m$. The former consists of a pair of semi-cylindrical jaws supported upon spring-shanks $l\ l'$. The latter is projected from a frame, $m'$, which is constructed to slide to and fro on a transverse bar, $n$. A spring-shears, $o$, is secured to the table to cut the cord when the sheaf is bound.

The operation of this machine is as follows: The cord on the spool is passed between the blades of the spring-shears $o$, and is secured in the spring-clamp $h'$ on the extremity of the binding-lever $h$, thus occupying the position in which it is represented in the drawing. When a sufficient quantity of grain to form a sheaf has been delivered upon the platform A, the attendant, standing behind the table $k$, applies his hand to the upper extremity of the movable standard $f$, and shoves in the direction indicated by the arrow. By this operation the friction-wheel $d'$ is brought in contact with that, $d$, on the counter-shaft D, and the drum C being revolved, the rake is drawn by the strap $c$ toward the curved standards $g\ g$. As it nears the end of the binding-lever $h$ an inclined plate projected from the rake-head passes beneath the end of the binding-lever, which, as the rake passes on to the position in which it is represented in dotted lines, is lifted into the position in which it is dotted; and as the grain is compressed between the rake and the standards $g$ with the whole power transmitted by the friction-wheels, the end of the binding-lever $h$, engaging in the indentations of the arm $g'$, secures the sheaf. The hand is then removed from the pivoted standard $f$, and the spring in the case E, which has been wound up by the direct motion of the rake, draws the latter back to its first position. The attendant then, seizing the cord proceeding from the spool $i$ and the end held by the spring-clamp, with his left hand, winds them round the spring-thimble, as represented at Fig. 2, at the same time depressing his hand so that those portions of the cord nearer his fingers enter the space between the jaws $l$. The right hand is then applied to the knob $x$ of the sliding-hook frame, and the hook, being passed through the thimble, seizes the depressed portion of the cords at $z$, and draws it through the coil upon the thimble, at the same time disengaging the whole from the thimble, and thus forming the knot, as represented at Fig. 3. A blow of the left hand upon the knob $o'$ of the spring-shears $o$ now severs the cord round the sheaf from that on the spool, and the binding-lever, being disengaged from the indentations in the arm, releases the sheaf, which falls through an opening made for that purpose in the platform. Previous to the disengagement of the binding-lever, the end of the cord is again engaged in the spring-clamp to be in readiness for the next sheaf. In order that the grain, in being gathered by the rake, may not fall through the space M, one or more arms, $w$, are projected from the rake-head, which, passing beneath the grain, bridges the space M, and prevents the grain from falling to the ground until after it is bound.

Having thus described my binding-machine, what I claim therein as new, and desire to secure by Letters Patent, is—

1. Gathering the grain and compressing it into a sheaf, substantially as herein set forth, by means of the rake and standards.

2. Carrying the cord round the sheaf, and holding the latter until the band is tied, by means of the curved lever $h$ and toothed arm $g'$, substantially as herein described.

3. The employment of the split thimble and sliding hook to aid in tying the band.

4. Alternating the rake to gather the grain and compress the sheaf, by means of the spring-strap and drum, substantially as herein set forth.

5. Bridging the space through which the bound sheaf drops, to support the grain while it is being gathered, substantially as herein set forth.

In testimony whereof I have hereto subscribed my name.

J. E. HEATH.

Witnesses:
P. H. WATSON,
E. S. RENWICK.